March 9, 1965   G. X. R. BOUSSU ETAL   3,172,445
TIRES
Filed Feb. 13, 1962   3 Sheets-Sheet 1

INVENTORS:
GABRIEL XAVIER ROGER BOUSSU
GEORGES LOUIS TRAVERS
BY
THEIR ATTORNEYS

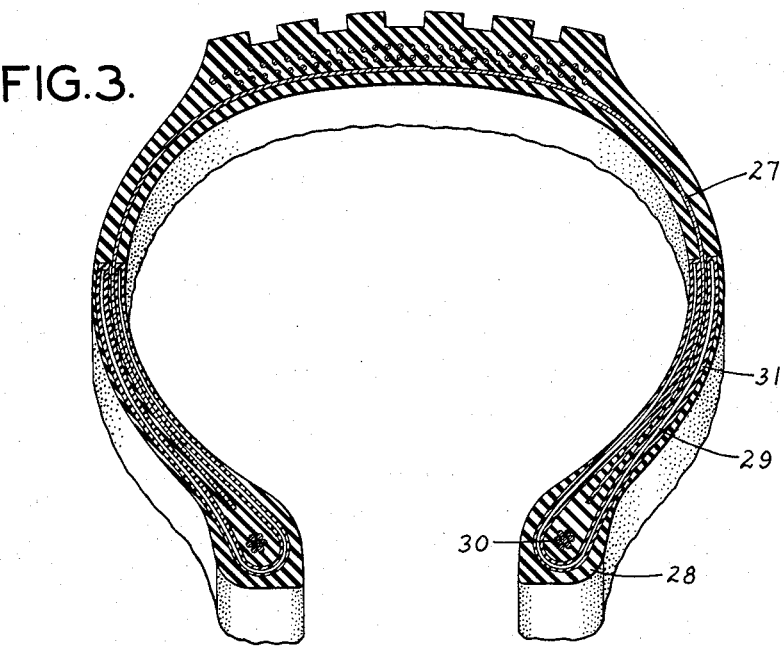
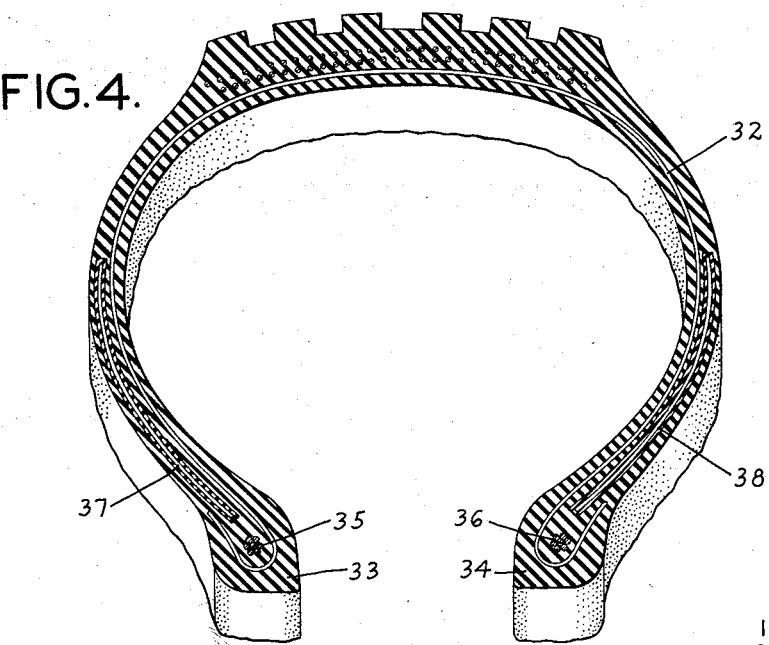

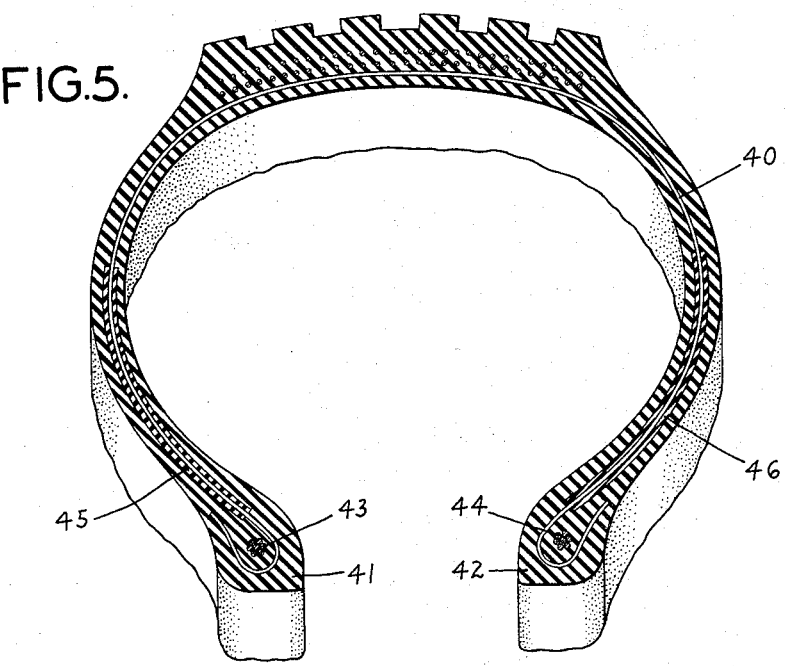

United States Patent Office 3,172,445
Patented Mar. 9, 1965

3,172,445
TIRES
Gabriel Xavier Roger Boussu, Chamalieres, Puy-de-Dome, and Georges Louis Travers, Clermont-Ferrand, France, assignors to Michelin & Cie, Clermont-Ferrand, France
Filed Feb. 13, 1962, Ser. No. 172,991
Claims priority, application France, Feb. 13, 1961, 852,481; Feb. 1, 1962, 886,582
5 Claims. (Cl. 152—354)

This invention relates to improvements in pneumatic tires and tire casings of the tube-containing and tubeless types which are provided with a plurality of layers or plies of metallic wires in the tread zone and radially or meridianally directed cords or wires in the carcass between the tread zone and the beads of the tire.

As disclosed in Boussu et al. U.S. application Serial No. 820,996, filed June 17, 1959, now U.S. Patent No. 3,062,259, granted November 6, 1962, the road stability of tires of the type mentioned above can be greatly improved, without loss of riding comfort and operating life by including plies of bias laid cord or wire in zones of the tire carcass, between each bead and the middle of the corresponding sidewall, to reduce the flexibility of the tire in those zones.

The present invention relates to improvements on the means for reducing the flexibility of the zones of the tire casing between the beads and the middle of the sidewall whereby excellent road stability is obtained together with improved ease of installation of the tire or tire casing on wheel rims having fixed rim flanges.

In one form of the invention, the carcass of the tire or tire casing (referred to hereinafter as a tire) contains in the zone between the bead and approximately the middle of the sidewall two layers or plies of meridianally or radially extending wires or cords. The two plies may be independent and may be a single ply wrapped around the bead wire or cable but ending in the bead and a second layer arranged between the bead and mid-sidewall. Alternatively the plies may consist of one strip folded around the bead wire with at least one edge ending at about the middle of the sidewall. The wires or cords of the plies may be sheathed or embedded in a layer of an elastomer, such as rubber, having a modulus of elasticity of at least 350 g./mm.² at 100% elongation.

In another form of the invention, the carcass is reinforced with a single ply of meridianally or radially extending wires or cords wrapped around the tire and ending in the bead, the wires or cords being embedded in a layer of an elastomer having a modulus of elasticity of at least 350 g./mm.² at 100% elongation in the zone between the bead and approximately the middle of the sidewall.

In a further modification of the invention, the carcass is reinforced with one ply of textile cords and includes between each bead and approximately the middle of each sidewall, at least one supplementary ply of meridianally or radially extending wires or cords sheathed in an elastomer having a modulus of elasticity of at least 350 g./mm.² at 100% elongation.

Generally, in accordance with the invention, the rigidity of the carcass between the bead and middle of the sidewall can be increased by increasing the number of plies therein depending on whether the wires or cords forming same are metal or textile, and by increasing the modulus of the elastomer in which plies or the wires or cords are embedded or increasing the amount and modulus of the elastomer. The zones of the tire between the tread and about the middle of each sidewall may be reinforced by a ply of radial or meridianal cords or wires or such reinforcements may be omitted to increase the pliability or flexibility of this portion of the sidewall.

The term "wire" as used herein includes single metallic wires and cables formed of a plurality of metallic wires.

The term "cord" as used herein includes plastic, natural, glass and other non-metallic filaments or threads, yarns and the like formed of a plurality of such filaments.

For a better understanding of the present invention, reference may be had to the accompanying drawings, in which:

FIGURE 3 is a view in cross-section of another form of tire embodying the invention;

FIGURE 4 is a view in cross-section of still another tire embodying the invention; and FIGURE 5 is a view in cross-section of another modification of the tire embodying the invention.

Figure 1:
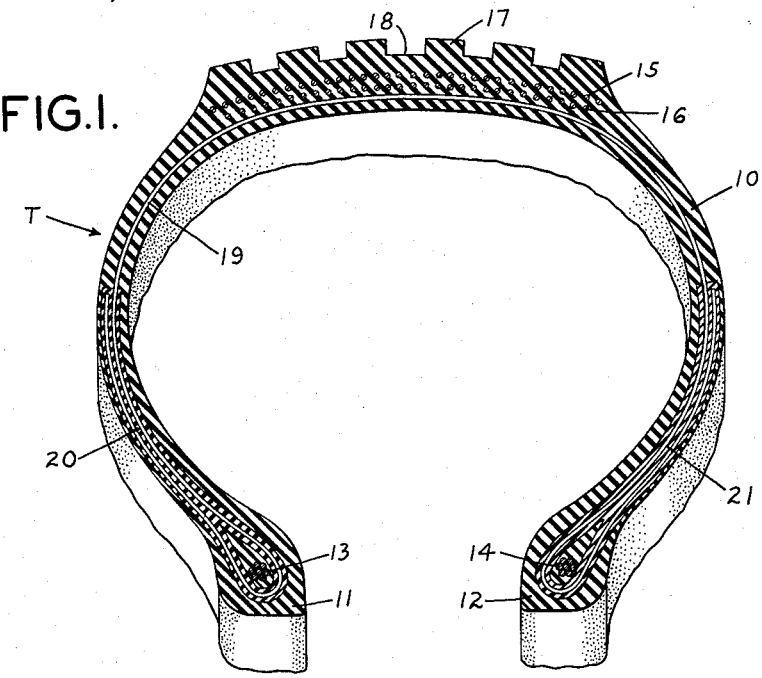
FIGURE 1 is a view in cross-section of a tire embodying the present invention.

A tire T embodying the present invention and illustrated in FIGURE 1 includes a carcass 10 having beads 11 and 12 at its inner ends, each provided with the usual bead wire 13, 14. Superimposed on the tread zone of the carcass are a plurality of plies, for example as illustrated, two plies 15 and 16 of wires. In each of the plies 15 and 16, the wires are parallel and the wires of one of the plies are disposed in crossing relation to the wires in the other ply.

A tread band 17 provided with suitable tread pattern 18 is superimposed on and is substantially coextensive with the plies 15 and 16.

The carcass comprises a ply 19 composed of a plurality of wires which extend meridianally or radially behind the plies 15 and 16 and through the sidewalls of the tire. The ply 19 is folded around the bead wires 13 and 14 to dispose its opposite edges substantially at the line M—M passing through the middle of the sidewalls of the tire. The portions of the ply 19 between the line M—M and the bead wires 13 and 14, and extending around them, are embedded in or coated with layers 20 and 21 of high modulus elastomer, e.g., rubber having a modulus of at least 350 g./mm.² at 100% elongation.

Modulus of elasticity of rubber and other elastomers is expressed by the equation, $$K=P/S$$

wherein K is the modulus, S is the cross-section of the test piece and P is the force necessary to double the length of the test piece (100% elongation). With materials of very high modulus, it is not practical to elongate or stretch the test piece 100%. Such materials are elongated only 25% or some other convenient amount, and the modulus is then calculated from the results obtained to determine the force required to stretch the test piece 100%. In the metric system, and as used herein, modulus of elasticity is expressed in grams per mm.².

In the U.S. system, modulus of elasticity is expressed in pounds per square inch at 100% elongation. 350 grams per mm.² corresponds to approximately 510 pounds per square inch in the U.S. system.

A tire of the type described has its tread reinforced against lateral and circumferential deformation or distortion and, as recognized heretofore, has greatly enhanced resistance to road abrasion and wear. Meridianally disposed wires, such as the wires of the ply 19, in that portion of the casing between the line M—M and the tread, reinforce the tire but enable it to flex readily to thereby dissipate shock and improve the riding comfort of the vehicle on which the tires are mounted. The more rigid sidewall structure between the line M—M and the beads greatly enhances the road stability of the tire and thereby improves the handling characteristics of vehicles having such tires. By positioning the wires of the ply 19 radially in the bead areas, the extensibility of the beads is not restricted to such an extent as to cause difficulty in installing the tire on a rim having fixed rim flanges.

Figure 2:
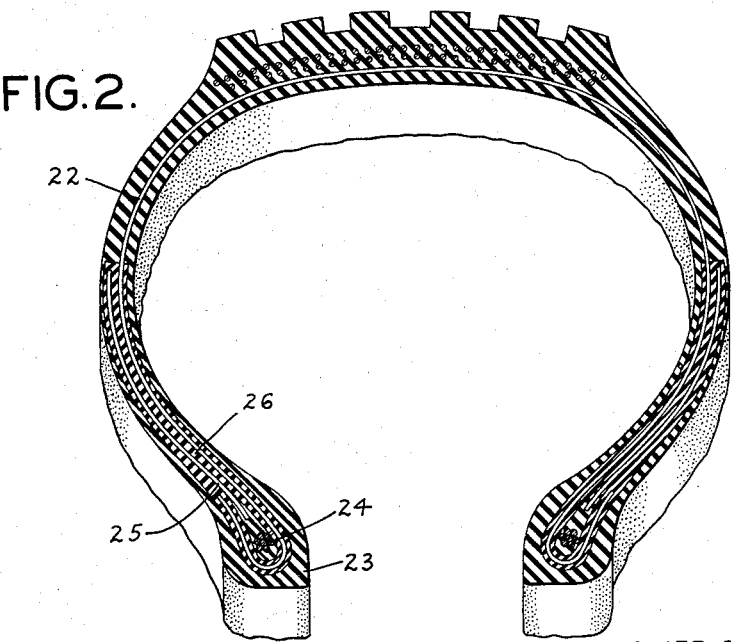
FIGURE 2 is a view in cross-section of a modified form of tire embodying the invention.

FIGURE 2 discloses a modified form of tire in which the carcass reinforcing ply 22 is composed of a layer of radially or meridianally extending wires which extend downwardly into the bead 23 on each side of the tire and are folded or wrapped around the bead wire 24 in each bead thereof. The edges of the ply 22 extend only slightly beyond the bead wires 24. Additional reinforcement and rigidity is imparted to the zone of the tire between the beads and mid-sidewall by means of an additional layer or ply 25 of meridianally extending wires having its inner edge disposed between the overlapping portion of the ply 22. Those portions of the plies 22 and 25 extending between the middle of the sidewall and into the beads are additionally reinforced and rigidified by embedding the wires thereof in a layer or layers 26 of high modulus elastomer, such as rubber, having a modulus of elasticity of at least 350 g./mm.$^2$ at 100% elongation.

FIGURE 3 illustrates another modification of the tire in which the carcass reinforcement is a layer or ply 27 of cords extending radially or meridianally through the tire from adjacent to bead 28 to adjacent to the other bead. Another ply 29 of meridianally extending wires is folded around the bead wire 30 and extends through the sidewall with both of its edges terminating at about the middle of the sidewall. The wires of the folded ply are coated with or embedded in a layer 31 of an elastomer, such as rubber, having a modulus of elasticity of at least 350 g./mm.$^2$ at 100% elongation.

The tire illustrated in FIGURE 4 is similar to that shown in FIGURE 3 and includes a carcass reinforcing ply 32 of meridianally or radially extending cords, the opposite ends of which extend into the beads 33 and 34 of the casing and are folded around the bead wires 35 and 36 therein. The ends of the cords 32 do not extend much beyond the beads of the tire, but additional rigidity is imparted to the inner zones of the sidewalls by means of plies 37 and 38 of meridianally or radially extending wires embedded in an elastomer, such as rubber, having a modulus of at least 350 g./mm.$^2$. The plies 37 and 38 extend from about the middle of each sidewall of the tire to closely adjacent the bead wires 35 and 36.

A further modification of the tire structure is shown in FIGURE 5 in which the carcass reinforcing ply 40 is composed of radially or meridianally extending wires which extend into the beads 41 and 42 of the casing, around the bead wires 43 and 44 therein and terminate in or close to the beads. Rigidification of the inner zones of the sidewalls is obtained by embedding the portions of the ply 40 in the inner zones of the sidewalls in layers 45 and 46 of rubber or other elastomer having a modulus of elasticity of at least 350 g./mm.$^2$ at 100% elongation.

Increased rigidification or reduction of flexibility in the portions of the sidewalls between about the middle of the sidewall and the adjacent bead can be accomplished by appropriately varying the modulus of elasticity of the rubber or other elastomer in which they are embedded. For example, a rubber of higher modulus of elasticity than 350 g./mm.$^2$ renders the sidewalls less flexible. The relations of the plies in the rigidified zones of the sidewalls of the tire are susceptible to considerable variation. For example, in the tire shown in FIGURE 3, the edges of the ply 27 may be disposed outside or inside of both layers of the ply 29 and can be extended around the bead wires. Moreover, the carcass plies may be interrupted in the area behind the tread of the tire so long as they overlap a substantial portion of the tread reinforcing plies therein. Accordingly, it will be understood that tires of the type embodying the present invention are susceptible to considerable modification and the forms of the invention disclosed herein are illustrative.

We claim:

1. A tire comprising a carcass having a tread portion, sidewalls on opposite sides of said tread portion and beads at the edges of said sidewalls, a plurality of plies of wires overlying said tread portion, each ply containing substantially parallel wires and the wires in at least one of said plies being in crossed relation to the wires of another of said plies, a tread band superimposed on said plies a carcass ply of exclusively meridianally extending cords in each sidewall extending from the bead thereon at least to the adjacent edge of said tread portion, a carcass reinforcement of exclusively meridianally extending wires in each sidewall, said reinforcement being limited exclusively to a zone from about the middle of each sidewall to the bead thereon, and a layer of an elastomer having a modulus of at least 350 g./mm.$^2$ at 100% elongation in said zone and sheathing the wires in said reinforcement.

2. The tire set forth in claim 1 in which said carcass reinforcement is a portion of said carcass ply disposed substantially parallel with said carcass ply.

3. The tire set forth in claim 1 in which said beads contain bead wires and said carcass ply has opposite edges folded around said bead wires and extends through said carcass from one bead wire to the other.

4. A tire comprising a carcass having a tread portion, sidewalls on opposite sides of said tread portion and beads at the edges of said sidewalls, a plurality of plies of wires overlying said tread portion, each ply containing substantially parallel wires and the wires in at least one of said plies being in crossed relation to the wires of another of said plies, a tread band superimposed on said plies, said carcass having a reinforcement consisting of a layer of elastomer containing substantially parallel cords, said reinforcement being limited exclusively to a zone from about the middle of each sidewall to the bead thereon and all of the cords in said zone extending exclusively radially of said carcass.

5. A tire according to claim 4 in which the elastomer has a modulus of at least 350 g./mm.$^2$ at 100% elongation.

References Cited in the file of this patent

UNITED STATES PATENTS

| 2,452,998 | Cuthbertson | Nov. 2, 1948 |
| 3,052,275 | Hylbert | Sept. 4, 1962 |
| 3,062,259 | Boussu et al. | Nov. 6, 1962 |

FOREIGN PATENTS

| 1,203,076 | France | July 27, 1959 |
| 789,770 | Great Britain | Jan. 22, 1958 |
| 859,749 | Great Britain | Jan. 25, 1961 |